US008864525B2

(12) United States Patent
Nakamura

(10) Patent No.: US 8,864,525 B2
(45) Date of Patent: Oct. 21, 2014

(54) MEMORY CARD CONNECTOR

(71) Applicant: Kyocera Connector Products Corporation, Kanagawa (JP)

(72) Inventor: Hidehiro Nakamura, Kanagawa (JP)

(73) Assignee: Kyocera Connector Products Corporation (JP)

( * ) Notice: Subject to any disclaimer, the term of this patent is extended or adjusted under 35 U.S.C. 154(b) by 49 days.

(21) Appl. No.: 13/826,299

(22) Filed: Mar. 14, 2013

(65) Prior Publication Data

US 2013/0237097 A1    Sep. 12, 2013

(30) Foreign Application Priority Data

Mar. 11, 2012 (JP) ................................. 2012-064663
Jun. 19, 2012 (JP) ................................. 2012-137484

(51) Int. Cl.
*H01R 13/64* (2006.01)
*G06K 7/00* (2006.01)

(52) U.S. Cl.
CPC .............. *H01R 13/64* (2013.01); *G06K 7/0026* (2013.01); *G06K 7/0056* (2013.01)
USPC ......................................................... 439/633

(58) Field of Classification Search
USPC ......... 439/633, 630, 629, 147, 160, 159, 327, 439/328; 235/379, 380
See application file for complete search history.

(56) References Cited

U.S. PATENT DOCUMENTS

| | | | |
|---|---|---|---|
| 5,196,972 A * | 3/1993 | Matsumaru et al. ............ | 360/94 |
| 5,386,329 A * | 1/1995 | Ikegawa ......................... | 360/94 |
| 5,530,691 A * | 6/1996 | Fujisawa ........................ | 720/731 |
| 5,629,819 A * | 5/1997 | Kitano .......................... | 360/99.02 |
| 5,748,420 A * | 5/1998 | Ko et al. ........................ | 360/133 |
| 6,118,619 A * | 9/2000 | Kabasawa .................... | 360/99.06 |
| 6,122,142 A * | 9/2000 | Kabasawa .................... | 360/99.06 |
| 6,154,338 A * | 11/2000 | Sasaki et al. ................ | 360/99.06 |
| 6,175,468 B1 * | 1/2001 | Koizumi et al. ................ | 360/94 |
| 6,175,471 B1 * | 1/2001 | Meguro ......................... | 360/133 |
| 6,185,070 B1 * | 2/2001 | Kumagai ....................... | 360/133 |
| 6,205,001 B1 * | 3/2001 | Vanderheyden et al. ...... | 360/132 |
| 6,222,810 B1 * | 4/2001 | Kang et al. .................... | 720/620 |
| 6,234,845 B1 * | 5/2001 | Hakozaki ...................... | 439/633 |
| 6,275,355 B1 * | 8/2001 | Oishi ............................. | 360/133 |
| 6,344,945 B1 * | 2/2002 | Ariyoshi .................... | 360/99.06 |
| 6,404,720 B1 * | 6/2002 | Inoue ............................ | 720/647 |
| 6,456,456 B1 * | 9/2002 | Romig et al. .............. | 360/99.02 |

(Continued)

FOREIGN PATENT DOCUMENTS

JP    2007157524    6/2007

*Primary Examiner* — Alexander Gilman
(74) *Attorney, Agent, or Firm* — McCormick Paulding & Huber LLP

(57) ABSTRACT

A memory card connector includes a housing including an accommodation portion and contacts, a slider movable between an initial position and a fully-inserted position, a correct-insertion abutting portion and an incorrect-insertion abutting portion provided on the slider, and a stopper-switch leaf spring. A stopper is provided on the stopper-switch leaf spring, wherein the slider is allowed to slidably move from the initial position to the fully-inserted position when the stopper-switch leaf spring is positioned at a stopper-ineffective position, and the slider is prevented from slidably moving from the initial position to the fully-inserted position when the stopper-switch leaf spring is positioned at a stopper-effective position. The stopper-switch leaf spring and the stopper are positioned within the housing when the stopper-switch leaf spring is in a free state.

8 Claims, 14 Drawing Sheets

(56) References Cited

U.S. PATENT DOCUMENTS 6,459,544 B1 * 10/2002 Harper .......................... 360/133
6,491,227 B2 * 12/2002 Izumi et al. ................... 235/487
6,511,350 B1 * 1/2003 Ito et al. ....................... 439/680

* cited by examiner

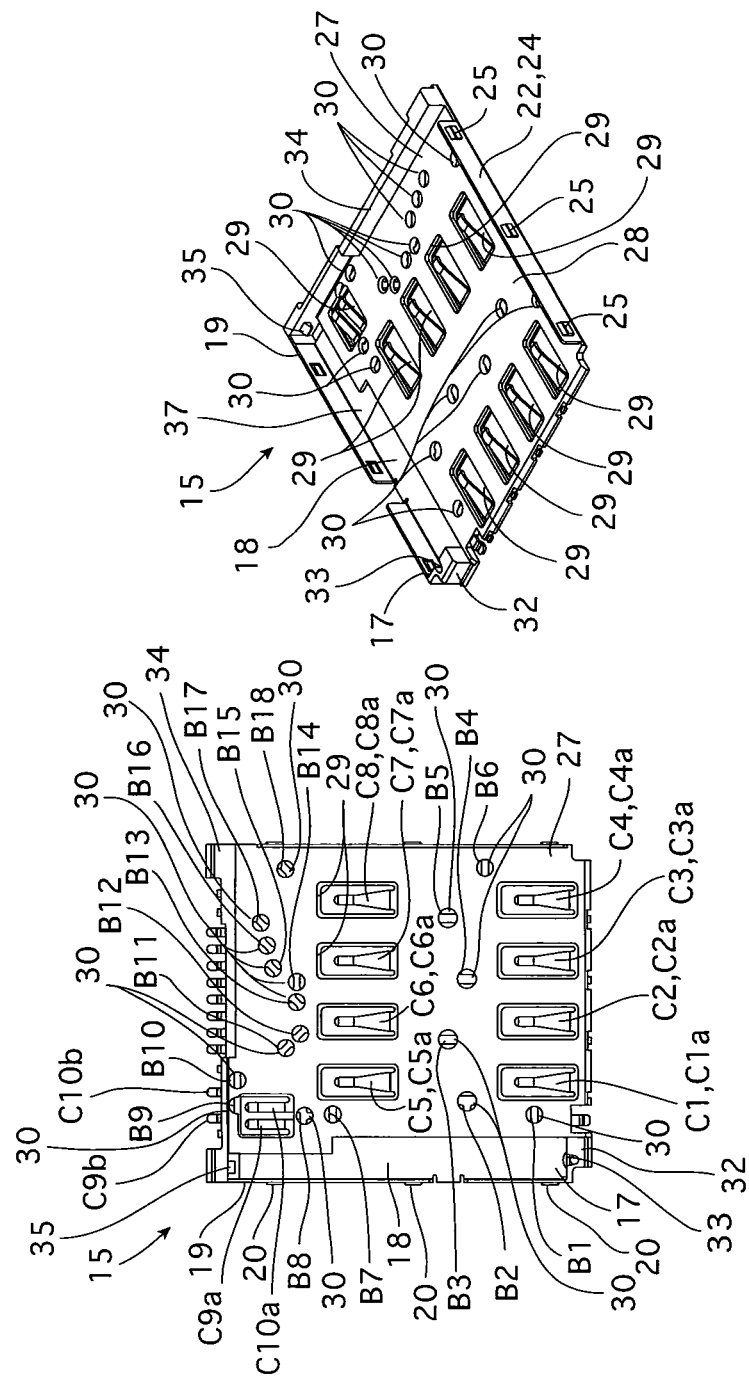

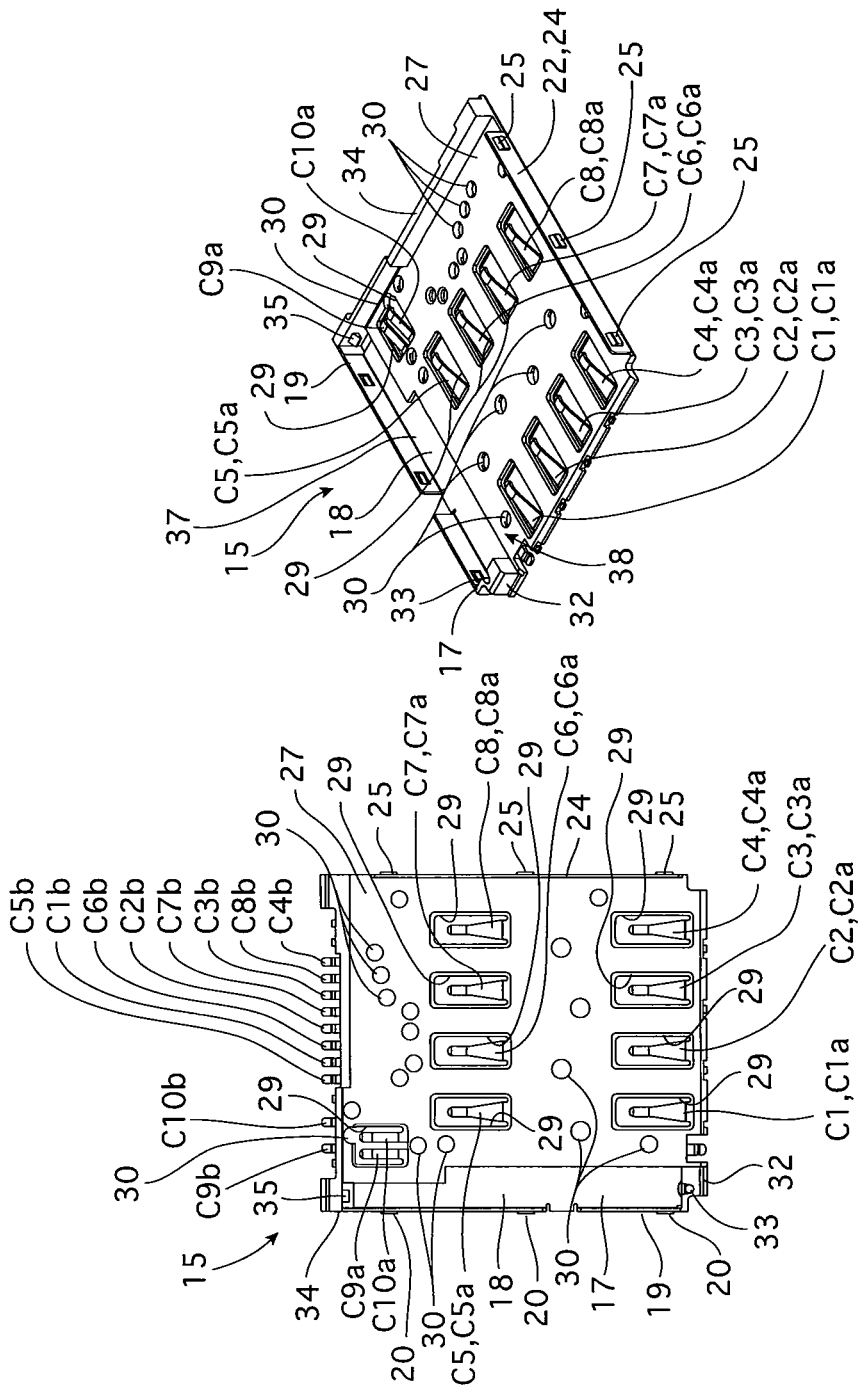

US 8,864,525 B2

MEMORY CARD CONNECTOR

CROSS REFERENCE TO RELATED APPLICATION

The present invention is related to and claims priority of the following application, namely, Japanese Patent Application No. 2012-064663 filed on Mar. 22, 2012, and Japanese Patent Application No. 2012-137484 filed on Jun. 19, 2012.

FIELD OF THE INVENTION

The present invention relates to a memory card connector for use with a memory card such as a micro SD card, a SIM card and a micro SIM card, etc.

BACKGROUND OF THE INVENTION

Japanese Unexamined Patent Publication No. 2007-157524 is an example of a memory card connector according to the related art.

This memory card connector is provided with a housing that is provided with a memory card accommodation portion into which a memory card is removably insertable, and a slider (slide member) which is slidable in the accommodation portion together with the memory card. A large number of contacts are provided on a base surface of the accommodation portion. These large number of contacts are electrically conductive with terminals of the memory card, upon the memory card being inserted into the accommodation portion. The slider is slidable relative to the housing between an initial position, at which the terminals of the memory card and the contacts of the housing do not contact each other (non-contact state), and a fully-inserted (fully depressed) position, at which the terminals of the memory card and the contacts of the housing are in contact with each other (contact state).

The memory card of the above-mentioned Japanese Unexamined Patent Publication No. 2007-157524 has a substantially rectangular shape in a plan view, however, since one of the four corners has a cut-off portion, the memory card has an asymmetrical shape as a whole.

Furthermore, a jutted portion is formed on the slider. When the memory card is correctly oriented while inserted into the housing (accommodation portion), this jutted portion engages with the cut-off portion of the memory card, so that the memory card is allowed to slidably move together with the slider from the initial position to the fully-inserted position. However, when the memory card is incorrectly oriented while inserted into the housing (accommodation portion), the jutted portion inclines the entire memory card with respect to the housing by abutting against the corners of the memory card other than the corner of the memory card having the cut-off portion. Accordingly, since part of the memory card fits into through-holes that are formed on the side edges of the housing, the slider which is in an integrated state with the memory card cannot slide from the initial position to the fully-inserted position.

Since the memory card connector disclosed in the above-mentioned Japanese Unexamined Patent Publication No. 2007-157524 prevents an incorrectly-inserted (incorrectly orientated) memory card from sliding with the slider from the initial position to the fully-inserted position by inclining the entire memory card at a specified angle to engage the memory card with the through-holes of the housing, a memory card that does not have a specified shape cannot be prevented from being incorrectly inserted (i.e., such a memory card connector only applies to a limited range of memory cards).

SUMMARY OF THE INVENTION

The present invention provides a memory card connector which can prevent an incorrectly oriented while inserted memory card from moving to the position at which the terminals of the memory card can become electrically conductive with the contacts of the housing without rotating the memory card, and in which the memory card connector has a simple structure and has a low profile as a whole.

According to an aspect of the present invention, a memory card connector is provided, including a housing including an accommodation portion, into which a substantially rectangular memory card having one cutoff corner portion and the remaining corners thereof having non-cutoff corner portions is removably insertable, and a plurality of contacts provided in the accommodation portion which are electrically conductive with terminals that are provided on the memory card; a slide which is slidably movable with the memory card between an initial position, at which the memory card is positioned on an outer side of the accommodation portion, and a fully-inserted position, at which the memory card is fully-inserted inside the accommodation portion together with the slider; a correct-insertion abutting portion and an incorrect-insertion abutting portion provided on the slider, wherein the cutoff corner portion of the memory card abuts against the correct-insertion abutting portion when the memory card is correctly oriented while inserted into the accommodation portion, and wherein one of the non-cutoff corner portions of the memory card abuts against the incorrect-insertion abutting portion when the memory card is incorrectly oriented while inserted into the accommodation portion; a stopper-switch leaf spring provided on the housing, wherein when the cutoff corner portion of the memory card abuts the correct-insertion abutting portion of the slider, which is positioned at the initial position, the stopper-switch leaf spring is positioned at a stopper-ineffective position via a pressure-receiving portion of the stopper-switch leaf spring being pressed by the memory card, and wherein when the non-cutoff corner portion of the memory card abuts the incorrect-insertion abutting portion of the slider, which is positioned at the initial position, the stopper-switch leaf spring is positioned at a stopper-effective position in which the memory card does not interfere with the pressure-receiving portion; and a stopper which is provided on the stopper-switch leaf spring, wherein the slider is allowed to slidably move from the initial position to the fully-inserted position when the stopper-switch leaf spring is positioned at the stopper-ineffective position, and the slider is prevented from slidably moving from the initial position to the fully-inserted position when the stopper-switch leaf spring is positioned at the stopper-effective position. The stopper-switch leaf spring and the stopper are provided within the housing so as not to externally protrude away from the housing when the stopper-switch leaf spring is in a free state.

It is desirable for a part of the pressure-receiving portion that is pressed by the memory card to be positioned toward a removal direction of the memory card with respect to the stopper.

It is desirable for the stopper-switch leaf spring to include a cantilever spring, and for the pressure-receiving portion which extends in a direction toward the memory card, when the memory card is fully-inserted into the accommodation portion, to be formed at an intermediate position on the stopper-switch leaf spring with respect to the longitudinal direction thereof.

Furthermore, it is desirable for a restriction surface formed on the stopper to lie on a plane that is normal to a straight line extending in the insertion/removal direction of the memory card when the stopper-switch leaf spring is in the free state. The slider is prevented from slidably moving from the initial position to the fully-inserted position when the stopper-switch leaf spring is positioned at the stopper-effective position.

It is desirable for the slider to be provided with a metal engaging portion which abuts the stopper when the stopper-switch leaf spring is positioned at the stopper-effective position.

It is desirable for the housing to include a first detection terminal and a second detection terminal which are separated from each other and each are connected to an insertion-state detection circuit. The metal engaging portion comes in contact with the first detection terminal and the second detection terminal and becomes electrically conductive therewith when the slider has been slidably moved to the fully-inserted position.

It is desirable for the housing to include a lower housing, including an open upper side, and a metal upper housing, wherein the lower side thereof is open, the metal upper housing being fixed onto the lower housing while covering the open upper side of the lower housing. A metal stopper-switch leaf spring and the stopper are integrally formed on part of the upper housing.

It is desirable for the stopper-switch leaf spring to include a cantilever stopper-switch leaf spring which extends in the insertion direction of the memory card from a base portion of the stopper-switch leaf spring, and for the pressure-receiving portion and the stopper to be formed at an end, or in the vicinity of the end, of the stopper-switch leaf spring.

The memory card connector according to the present invention prevents the terminals of a memory card that has been incorrectly oriented while inserted into the accommodation portion of the housing from being electrically conductive with contacts that are provided with the housing by restricting movement of the slider from the initial position to the fully-inserted position by utilizing (without rotating the memory card to engage it with holes formed in the housing) a stopper-switch leaf spring (a pressed portion and a stopper). Accordingly, the incorrect insertion of memory cards having various shapes, each having a cut-off corner portion and having a substantially rectangular shape as a whole, can be prevented.

Furthermore, since when the stopper-switch leaf spring is in a free state, the stopper-switch leaf spring and the stopper are both positioned within the house (so as not to externally protrude away from the housing), the entire memory card connector can have a low profile.

Furthermore, since the memory card connector has a structure that utilizes the stopper-switch leaf spring (and the pressed portion and the stopper) that is fixed to the housing, the structure thereof is simple.

BRIEF DESCRIPTION OF THE DRAWINGS

The present invention will be discussed below in detail with reference to the accompanying drawings, in which:

FIG. 9A is a plan view of an integrated component, formed by injection molding, of the metal integrated member and an insulator;

FIG. 9B is a perspective view of the integrated component of the metal integrated member and the insulator, as viewed from the upper side;

FIG. 10A is a plan view of a lower housing that is completed upon each bridge of the integrated component of FIGS. 9A and 9B are cut;

FIG. 10B is a perspective view of the lower housing, as viewed from the upper side;

BRIEF DESCRIPTION OF THE PREFERRED EMBODIMENTS

Figure 1:
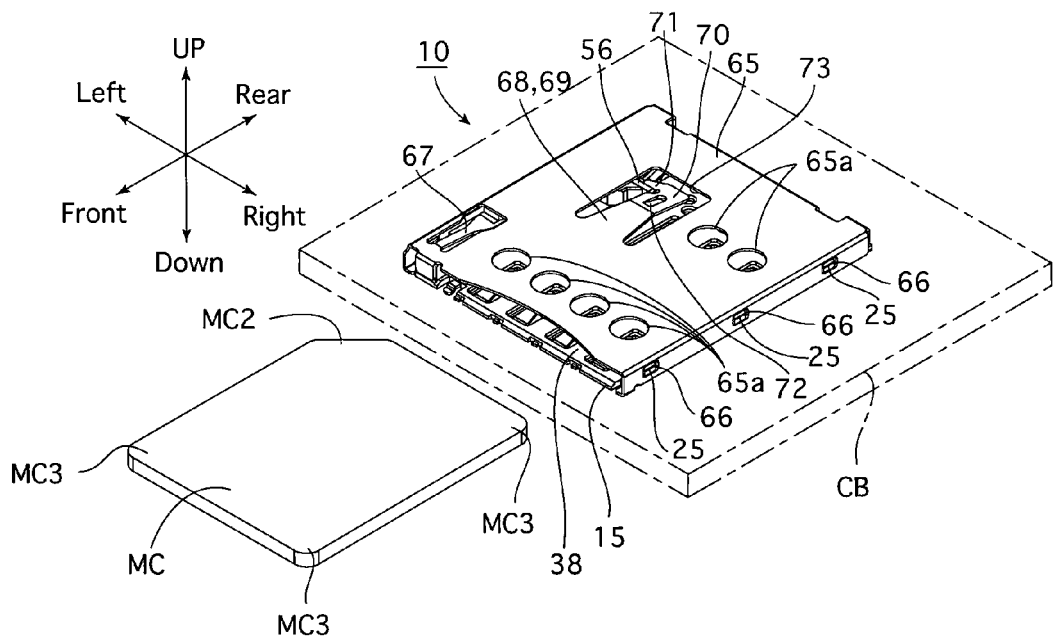
FIG. 1 is a perspective view of a connector and a micro SIM card, as viewed in an oblique direction from the front upper side thereof, according to a first embodiment of the present invention.
Figure 2:
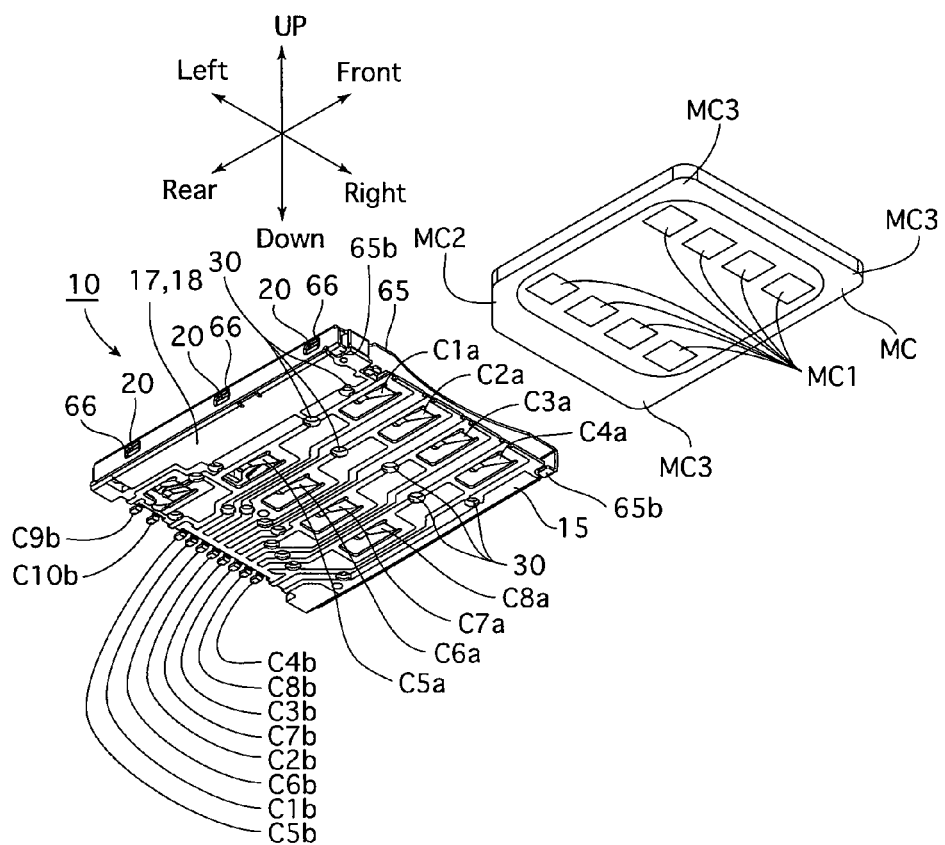
FIG. 2 is a perspective view of the connector and the micro SIM card, as viewed in an oblique direction from the front lower side thereof.
Figure 3:
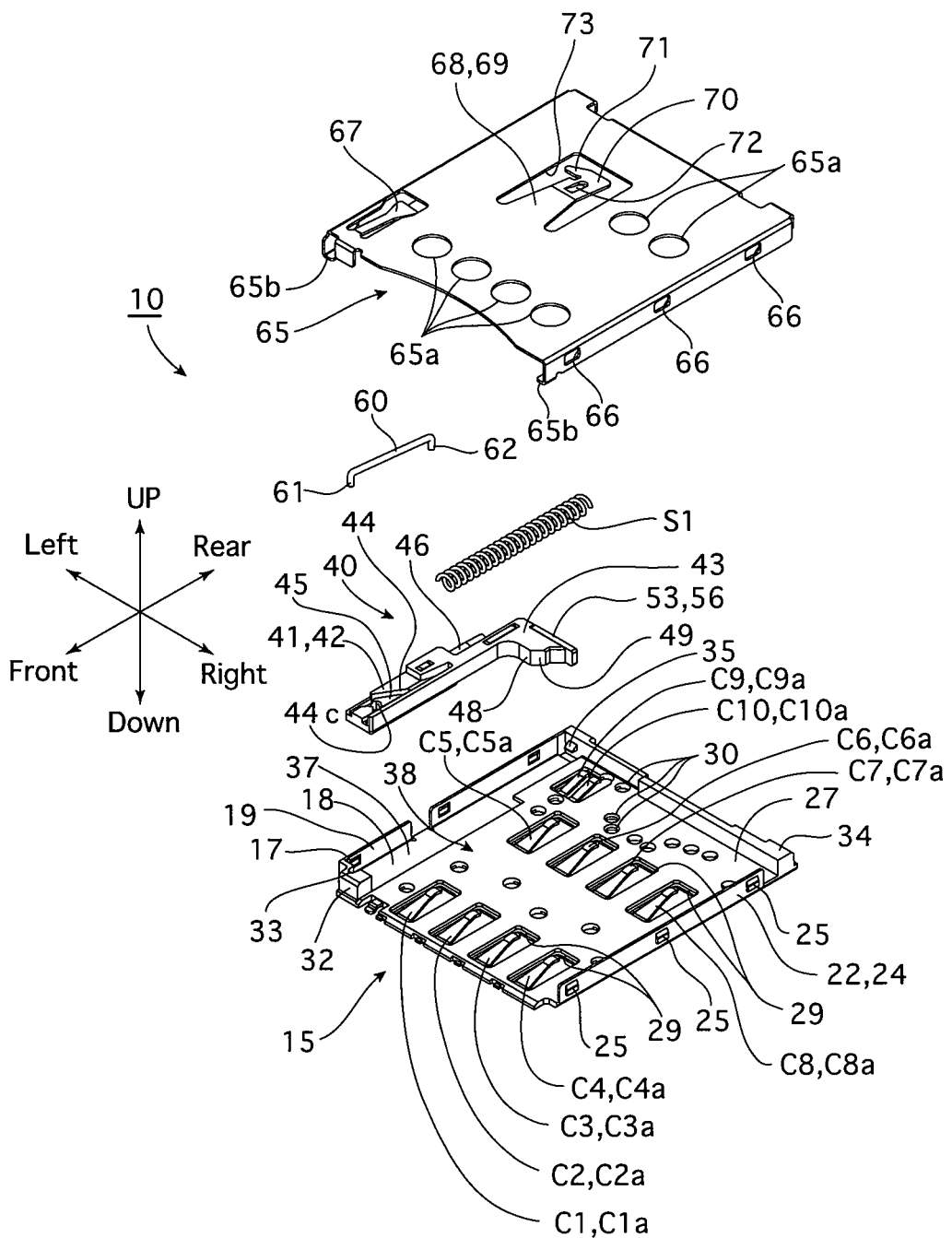
FIG. 3 is an exploded perspective view of the connector, as viewed from the front upper side thereof.
Figure 4:
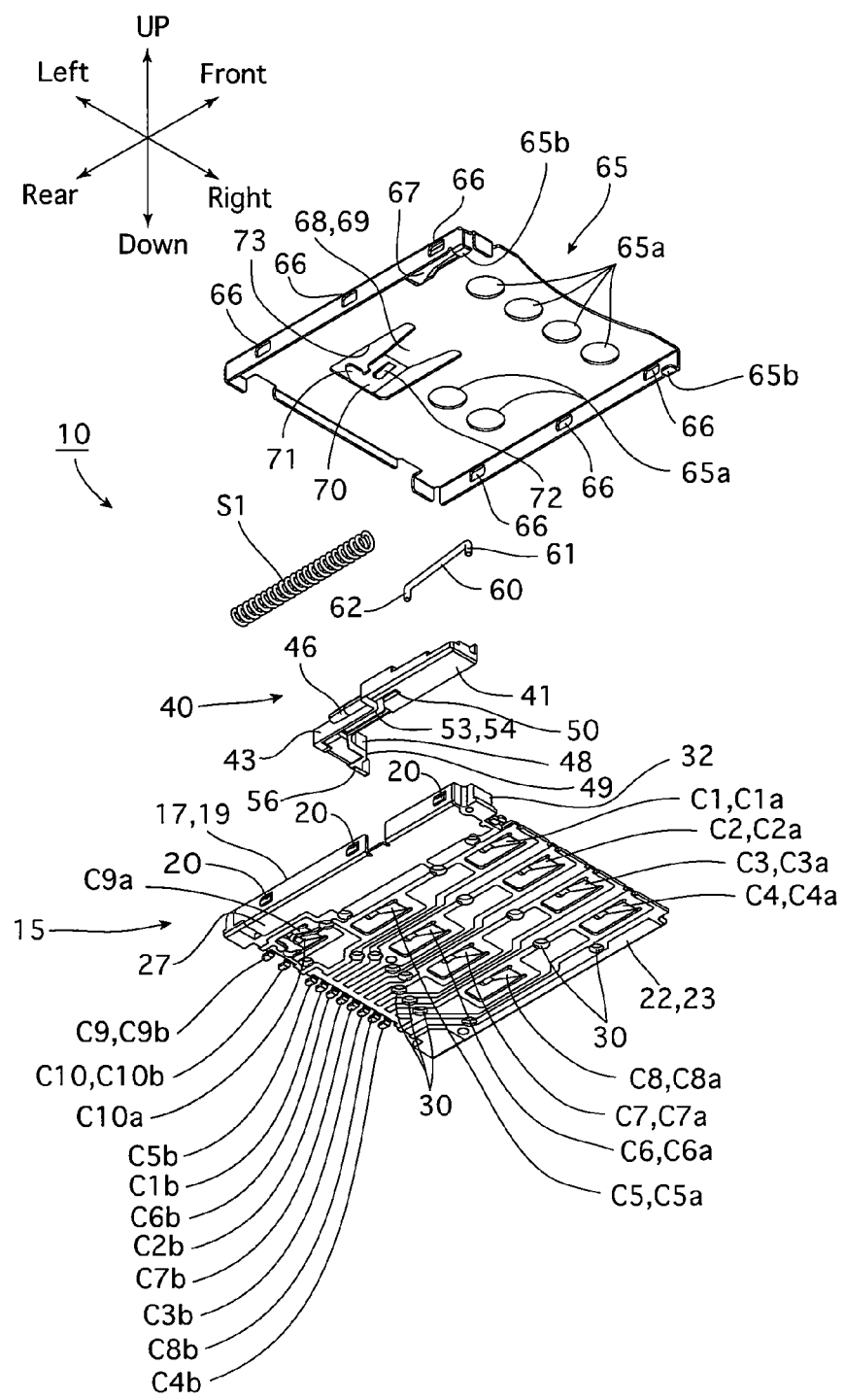
FIG. 4 is an exploded perspective view of the connector, as viewed from the front lower side thereof.

An embodiment of the present invention will be hereinafter discussed with reference to FIGS. 1 through 26. Note that the "upward", "downward", "left", "right", "forward" and "rearward" directions are based on the directions of the arrows that are indicated in the drawings.

A memory card connector 10 of the illustrated embodiment is a micro SIM card memory-card connector which can be applied to a mobile phone.

The memory card connector 10 is provided with a lower housing 15 (housing), a slider 40, a cam bar 60, an upper housing 65 (housing), and a compression coil spring S1, as major components thereof.

The lower housing 15, which has a substantially rectangular shape in a plan view, is an integral molded product provided with a left housing-forming section 17, a right housing-forming section 22, eight contacts C1 through C8, a first detection terminal C9, a second detection terminal C10, and an insulator 27 formed from a compound resin having insulation properties and heat-resistivity.

Figure 8A:
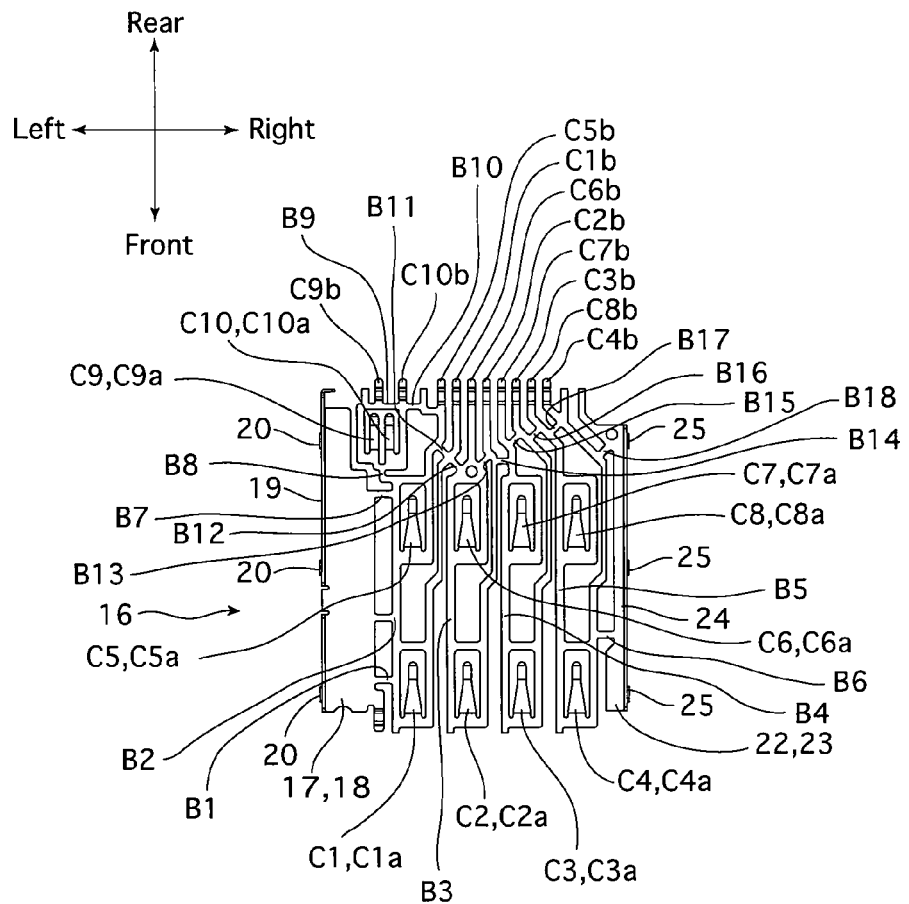
FIG. 8A is a plan view of a metal integrated member.
Figure 8B:
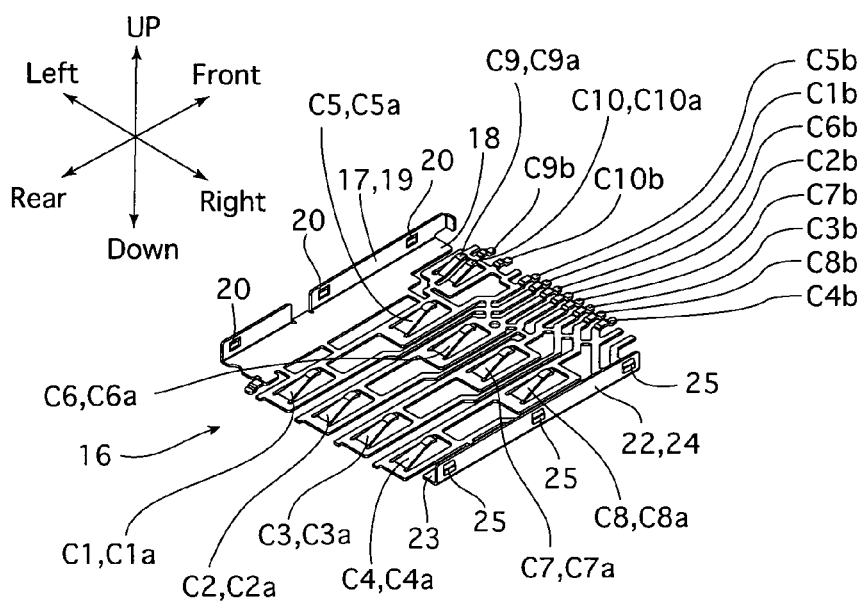
FIG. 8B is a perspective view of the metal integrated member, as viewed from the upper side.
Figure 11:
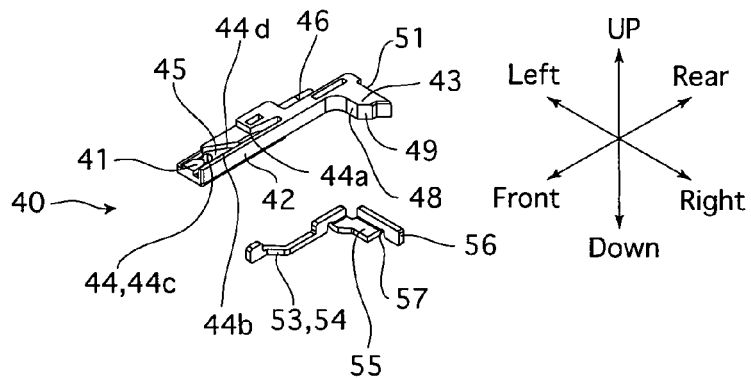
FIG. 11 is an exploded perspective view of a slider body and a conductor/engagement member, which are components of a slider, as viewed from the front.
Figure 12:
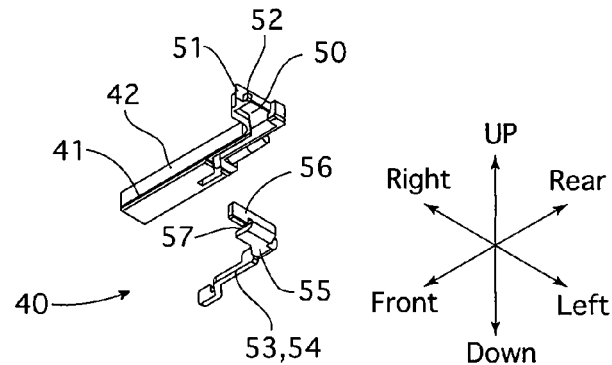
FIG. 12 is an exploded perspective view of the slider body and the conductor/engagement member, as viewed from the rear.
Figure 13:
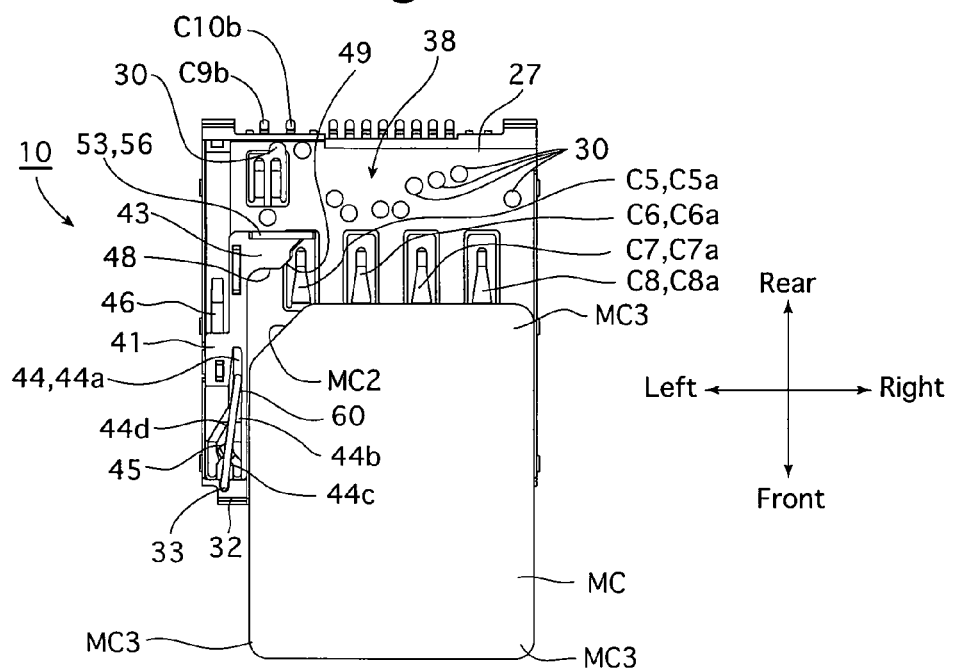
FIG. 13 is a plan view of the memory card connector showing a micro SIM card beginning to be inserted into the connector correctly, with the upper housing and a compression coil spring omitted.

The left housing-forming section 17, the right housing-forming section 22, the contacts C1 through C8, the first detection terminal C9 and the second detection terminal C10 are press-formed out of a single sheet of metal, and as shown in FIGS. 8A and 8B, before the lower housing 15 is formed (immediately after the pressing operation), and form the sections of a single integrated member 16.

The left housing-forming section 17 is provided with a horizontal plate-shaped slider-support section 18, an upright left wall section 19 that extends upwardly from the left edge of the slider-support section 18, and three left lock-engagement projections 20 formed on the left side surface of the left wall section 19.

The right housing-forming section 22 is provided with a horizontal plate-shaped base section 23, an upright right wall section 24 that extends upwardly from the right edge of the base section 23, and three right lock-engagement projections 25 formed on the right side surface of the right wall section 24.

The contacts C1 through C8 are integrally provided with contact pieces C1a through C8a which extend rearwardly in an upward inclined direction from base sections (front ends) thereof, respectively; and tail pieces C1b through C8b which project from the rear end of the metal integrated member 16, are positioned a step downward from the slider-support section 18 and the base section 23, and are continuous with the contact pieces C1a through C8a, respectively.

The first detection terminal C9 and the second detection terminal C10 are integrally provided with contact pieces C9a and C10a which extend rearwardly in an upward inclined direction from base sections (front ends) thereof, respectively; and tail pieces C9b and C10b which project from the rear end of the metal integrated member 16, are positioned a step downward from the slider-support section 18 and the base section 23, and are continuous with the contact pieces C9a and C10a respectively.

As shown in the drawings, the metal integrated member 16 is provided with a total of eighteen (18) cutoff bridges B1 through B18 which mutually connect the left housing-forming section 17, the right housing-forming section 22, the contacts C1 through C8, the first detection terminal C9 and the second detection terminal C10, which are adjacent to each other.

As shown in FIGS. 9A and 9B, the insulator 27 is formed integral with the metal integrated member 16 by injection molding the metal integrated member 16 in a die (not shown), and is provided with a base-surface section 28 constituting the base surface section of the lower housing 15, a cam-bar support section 32, and a rear wall 34.

The base-surface section 28 is provided with a total of nine (9) contact-exposing holes 29 for exposing the contact pieces C1a through C10a, and a total of eighteen (18) bridge-exposing holes 30, which are round holes, for exposing the cutoff bridges B1 through B18. A cam-bar support groove 33 is formed downwards in the upper side of the cam-bar support section 32, which forms a front end of the left side of the lower housing 15. A spring support projection 35 is formed at the left side of the rear wall 34, which forms the rear end of the lower housing 15, and projects forwardly therefrom. Furthermore, as shown in the drawings, the slider-support section 18 of the left housing-forming section 17 is positioned one step downward from (the left edge of) the base-surface section 28 (there is a step between the upper surface of the left housing-forming section 17 and the upper surface of the base-surface section 28). The portion surrounding the right side surface of the left wall section 19, the left side surface of the base-surface section 28 and the upper surface of the slider-support section 18 define a slide groove 37.

In the injection molding process, since the left housing-forming section 17, the right housing-forming section 22, the contacts C1 through C8, the first detection terminal C9 and the second detection terminal C10 are mutually integrated with each other via the cutoff bridges B1 through B18, the left housing-forming section 17, the right housing-forming section 22, the contacts C1 through C8, the first detection terminal C9 and the second detection terminal C10 do not separate from each other or shift out of alignment with each other before the injection molding process or during the injection molding process (inside the die).

After opening up the above-mentioned die and removing the integrally molded product of the metal integrated member 16 and the insulator 27 from the die, the lower housing 15 as shown in FIGS. 10A and 10B is obtained upon physically cutting the cutoff bridges B1 through B18 (the cutoff bridges B1 through B18 are each cut in two, and the two cut regions are mutually moved away from each other) exposed by the bridge-exposing holes 30 using a cutter machine (not shown). As shown in the drawings, the internal space in the lower housing 15 is defined by an accommodation portion 38 which is surrounded by the left wall section 19, the right wall section 24 and the rear wall 34.

The slider 40 is integrally provided with a slider body 41 and a conductor/engagement member 53. The slider body 41, which is formed from a heat-resistant compound resin, is provided with a linear portion 42 which extends in the forward/rearward direction and slidably engages the lower edge thereof with the slide groove 37, and an abutment end 43 which projects rightward from the rear end of the linear portion 42.

The front part of the upper side of the linear portion 42 is provided with a heart-cam groove 44, which is substantially heart-shaped in a plan view. The heart-cam groove 44 is an uneven groove having a large number of steps (stages) and surrounds (and defines the periphery of) a heart-shaped protrusion 45. The heart-cam groove 44 is provided with an initial engagement section 44a which defines the rear portion of the heart-cam groove 44 and extends linearly in the forward/rearward direction, a push-insertion passage section 44b positioned at the right side of the heart-shaped protrusion 45, a holding section 44c provided at the front end of the heart-shaped protrusion 45, and a return passage section 44d at the left side of the heart-shaped protrusion 45.

A cylindrical spring-support shaft 46 is provided on a left half portion of the rear part of the slider body 41 and projects therefrom in the rearward direction. An incorrect-insertion abutting portion 48, which is flat surface lying on a plane that is normal (orthogonal) to a straight line extending in the forward/rearward direction, is formed on a front side of the abutment end 43. A correct-insertion abutting portion 49, which is a flat surface lying in a plane that is inclined to the incorrect-insertion abutting portion 48 in a plan view, is formed on the right side of the incorrect-insertion abutting portion 48. Furthermore, the underside of the slider body 41 is provided with an underside mounting groove 50 which extends from the rear end of the slider body 41 to approximately half-way along the slider body 41, and a rear-end mounting groove 51 is formed on the rear-end surface of the slider body 41 and is continuous with the rear end portion of the underside mounting groove 50. Furthermore, an upwardly facing lock-engaging projection 52 is formed on the rear end of the slider body 41.

The conductor/engagement member 53, which is a metal press-formed product, is provided with a fitting portion 54 which extends in substantially the forward/rearward direction, a base portion 55 which extends in the right direction from a lower edge of the rear end of the fitting portion 54, and an upright engaging portion 56 which extends upwards from the rear edge of the base portion 55. A retainer groove 57 is formed in the lower end of the engaging portion 56, and the connecting end portion between the base portion 55 and the engaging portion 56 defines a rounded surface.

The slider 40 is configured as an integrated member of the slider body 41 and the conductor/engagement member 53, in which the fitting portion 54 and the base portion 55 of the conductor/engagement member 53 are fitted into the underside mounting groove 50 from below, and the engaging portion 56 is fitted into the rear-end mounting groove 51 while the retainer groove 57 is engaged with the lock-engaging projection 52 from above.

Figure 20:
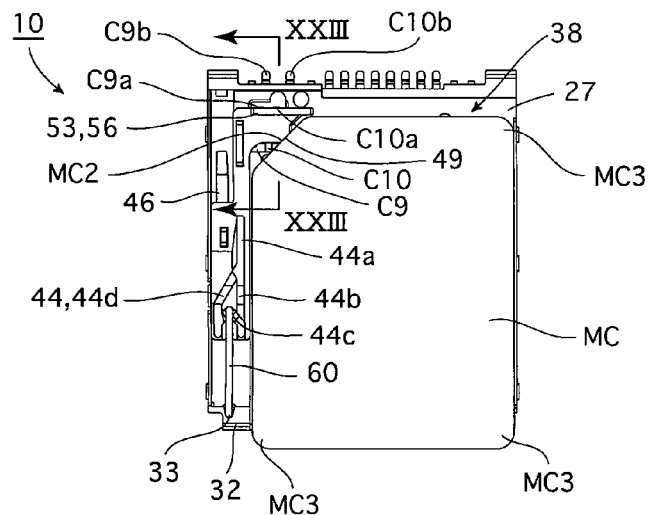
FIG. 20 is a plan view similar to that of FIG. 13 showing a state when the slider has been slidably moved to the fully-inserted position.
Figure 21:
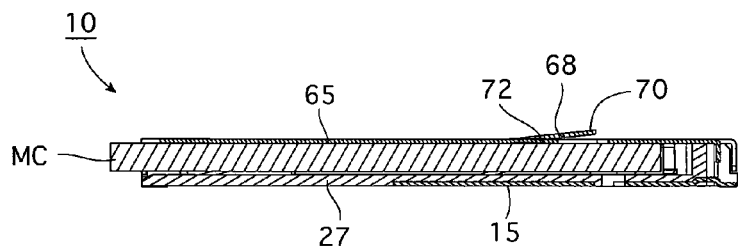
FIG. 21 is a sectional view similar to that of FIG. 15 in the state shown in FIG. 20.
Figure 22:
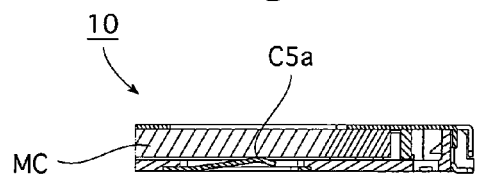
FIG. 22 is a sectional view similar to that of FIG. 16 in the state shown in FIG. 20.
Figure 23:
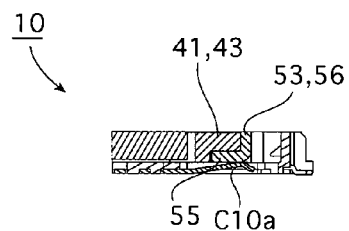
FIG. 23 is a sectional view taken along the XXIII-XXIII line shown in FIG. 20, viewed in the direction of the appended arrows.

The slider 40 is slidable in the forward/rearward direction along the slide groove 37 relative to the lower housing 15 between an initial position shown in FIGS. 6, 13, 17 and 24, and a fully-inserted position shown in FIG. 20. Furthermore, the compression coil spring S1 is provided in between the rear end portion of the slider 40 and a left side portion of the rear wall 34 in a contracted (elastically deformed) state compared to the free state thereof. The front portion of the compression coil spring S1 is inserted over the spring-support shaft 46, and the rear portion of the compression coil spring S1 is lock-engaged with the spring support projection 35. Accordingly, since the S1 constantly applies a forward biasing force against the slider 40, the slider 40 is positioned at the initial position when no external force other than the force of the compression coil spring S1 is applied to the slider 40.

The metal cam bar 60 is a member which interconnects the lower housing 15 with the slider body 41. The cam bar 60 is provided with a front-end engaging projection 61 which is bent downwards from the front end of the cam bar 60, and a rear-end engaging projection 62 which is bent downwards from the rear end of the cam bar 60. The front-end engaging projection 61 is rotatably engaged with the cam-bar support groove 33 of the lower housing 15 (cam-bar support section 32), and the rear-end engaging projection 62 is engaged with the heart-cam groove 44 of the slider body 41 to be relatively movable thereto.

The upper portion of the lower housing 15, which accommodates the slider 40, the cam bar 60 and the compression coil spring S1, is covered by the upper housing 65.

The upper housing 65, which is a metal press-formed product, is provided with a total of six (6) engagement holes 66 formed on the left and right side walls of the upper housing 65 (three engagement holes 66 are formed on the left side wall of the upper housing 65 and three engagement holes 66 are formed on the right side wall of upper housing 65). The upper housing 65 is mounted onto the lower housing 15 by fitting the engagement holes 66 onto the corresponding left lock-engagement projections 20 and corresponding right lock-engagement projections 25 of the lower housing 15. Since six (6) round holes 65a are formed through the roof surface of the upper housing 65, it is possible to visually confirm the internal state of the lower housing 15, especially the contact pieces C1a through C4a, C7a and C8a of the contacts C1 through C4, C7 and C8, through the round holes 65a. Furthermore, the front portions of the left and right sides of the upper housing 65 are respectively provided with tail pieces 65b, which extend substantially horizontally in a mutually inward direction.

A cam-bar biasing leaf spring 67, which is formed during a press-forming process, is formed in the vicinity of the left corner portion at the front end of the upper surface of the upper housing 65. The cam-bar biasing leaf spring 67 is a cantilever leaf spring that extends rearwardly while inclining downward from the base portion thereof (from the front end thereof). The cam-bar biasing leaf spring 67 is positioned downward from the roof surface of the upper housing 65 in a free state. Since the cam-bar biasing leaf spring 67 constantly biases the cam bar 60 toward the base surface (downwardly) of the lower housing 15, the engagement of the front-end engaging projection 61 of the cam bar 60 with the 33 and the engagement of the rear-end engaging projection 62 with the heart-cam groove 44 are constantly maintained.

A central hole 73 and a stopper-switch leaf spring 68, positioned at the central portion of the central hole 73, are formed at approximately the central section of the upper surface of the upper housing 65 during a press-forming process. Furthermore, sections of the central hole 73 exist on the left and right sides of the stopper-switch leaf spring 68, and the contact pieces C5a and C6a of the contacts C5 and C6 can be visually confirmed through these sections.

The stopper-switch leaf spring 68 is a cantilever leaf spring that extends rearwardly from the base portion thereof (from the front end thereof). When the stopper-switch leaf spring 68 is in a free state, a front portion 69 of the stopper-switch leaf spring 68 is positioned substantially on the same plane as that of the roof surface of the upper housing 65, and a rear portion 70 of the stopper-switch leaf spring 68 is positioned (inclined) downward from the roof surface of the upper housing 65 at a stopper-effective position (see FIGS. 3 and 15). A pressure-receiving portion 72 is formed by cutting out an approximately central portion of the rear portion 70 of the stopper-switch leaf spring 68; the pressure-receiving portion 72 is provided at a region positioned further forward than the front surface of the stopper 71, and the pressure-receiving portion 72 is, in effect, not elastically deformable and is inclined downwardly in the rearward direction from the base portion (front end) thereof. When the pressure-receiving portion 72 is pressed upwards, the stopper-switch leaf spring 68 elastically deforms and moves upward to a stopper-ineffective position shown in FIGS. 18 and 21.

Figure 14:
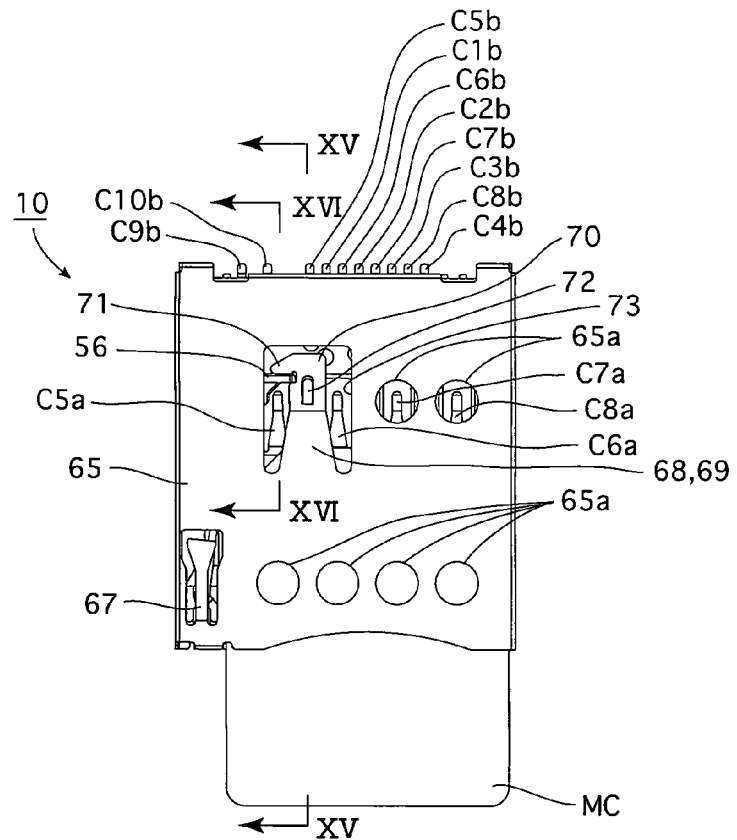
FIG. 14 is a plan view of the memory card connector showing a micro SIM card beginning to be inserted into the connector correctly.
Figure 15:
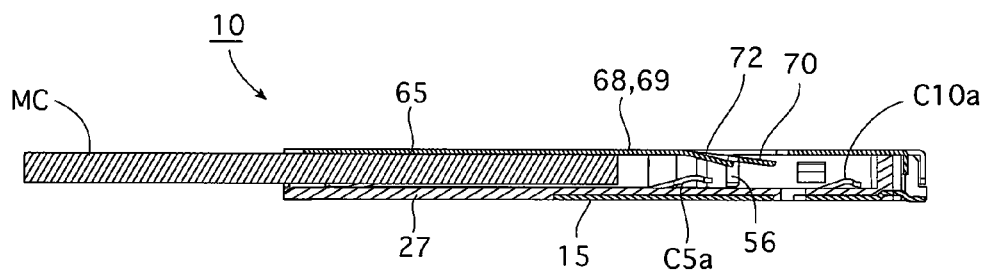
FIG. 15 is a sectional view taken along the XV-XV line shown in FIG. 14, viewed in the direction of the appended arrows.
Figure 16:
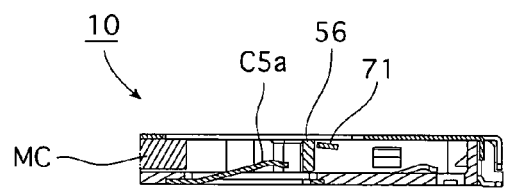
FIG. 16 is a sectional view taken along the XVI-XVI line shown in FIG. 14, viewed in the direction of the appended arrows.

A stopper 71 is formed on the end (rear end portion) of the rear portion 70 and projects in the leftward direction therefrom. As shown in FIGS. 1 and 14, when the slider 40 is positioned at the initial position and the stopper-switch leaf spring 68 is positioned at the stopper-effective position, since the rear surface of the engaging portion 56 engages, from the front direction, with a flat-surfaced front surface (restriction surface) of the stopper 71 (as shown in FIG. 16, since the stopper 71 is slightly inclined with respect to the horizontal direction in a side elevational view, strictly speaking, the rear surface of the engaging portion 56 engages from the forward direction with the lower edge of the restriction surface), and the slider 40 is maintained at the initial position (the slider 40 is restricted from sliding to the fully-inserted position).

Figure 7:
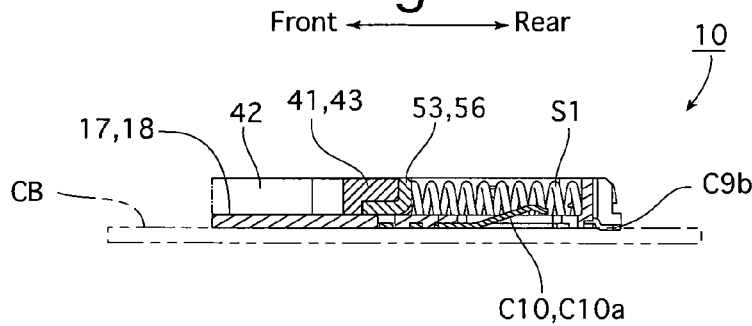
FIG. 7 is a sectional view taken along the VII-VII line shown in FIG. 6, viewed in the direction of the appended arrows.

The memory card connector 10, having the above-described configuration, is installed onto an upper surface of a circuit board CB (shown by phantom lines in FIGS. 1 and 7). Specifically, the upper surface of the upper housing 65 is vacuum held by a vacuum apparatus (not shown) that is positioned above the memory card connector 10, the tail pieces C1b through C8b of the contacts C1 through C8 are placed onto solder paste that has been applied onto a circuit pattern on the circuit board CB, the tail pieces C9b and C10b of the first detection terminal C9 and the second detection terminal C10 are respectively placed onto solder paste that has been applied onto an insertion-state detection circuit pattern (insertion-state detection circuit) on the circuit board CB, and the tail pieces 65b are placed onto solder paste that has been applied onto a ground pattern on the circuit board CB by moving the above-mentioned vacuum apparatus (which is vacuum holding the upper surface of the upper housing 65); the solder paste is heated and melted in a reflow furnace, so that the tail pieces C1b through C10b and the tail pieces 65b are attached to the respective above-mentioned patterns.

The following descriptions concern the operations that are carried out when a memory card MC is inserted into and removed from the memory card connector 10, having the above-described configuration.

Eight (8) terminals MC1 are formed on the underside of the memory card MC, which has a substantially rectangular shape in a plan view. Furthermore, one of the four corners of the memory card MC (the left rear corner as shown in FIGS. 1, 2, and 13 through 22) defines a cutoff corner portion MC2 which has been cut off in a straight line that is orthogonal to a diagonal line extending between two opposite corners (one of which the cutoff corner portion MC2 is located) of the memory card MC; the remaining three corners of the memory card MC are each defined as a non-cutoff corner portion MC3.

Figure 5:
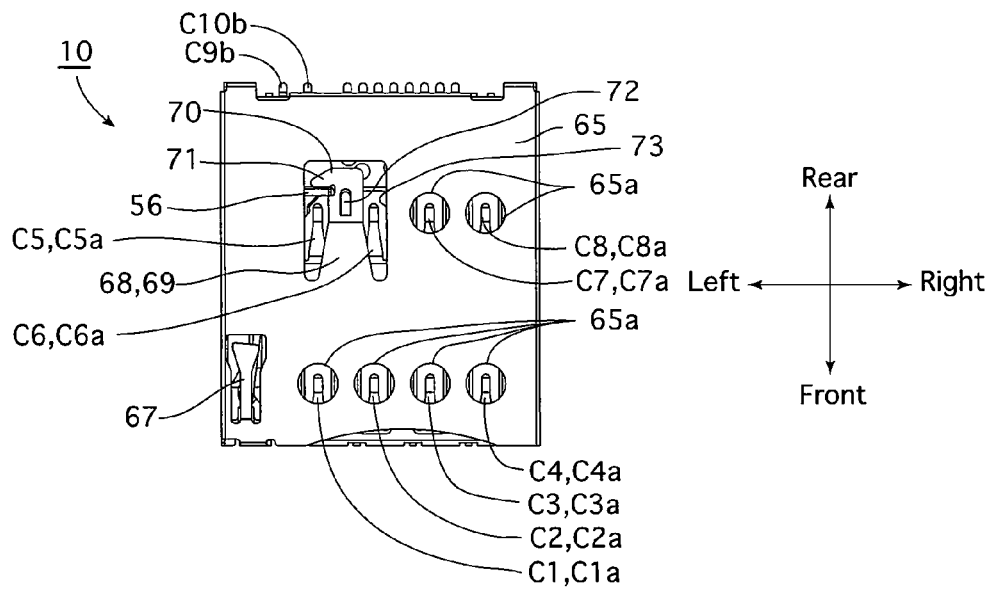
FIG. 5 is a plan view of the connector.
Figure 6:
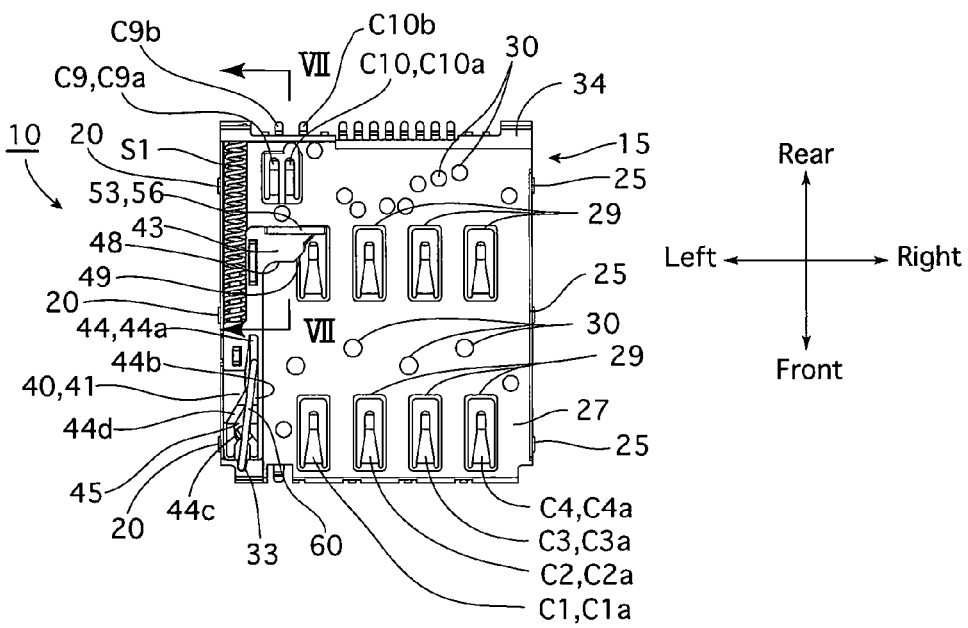
FIG. 6 is a plan view of the connector with the upper housing removed therefrom.

In a state where the memory card MC is not inserted into the memory card connector 10, the slider 40 is positioned at the initial position by the biasing force of the compression coil spring S1, and furthermore, the rear-end engaging projection 62 of the cam bar 60 is engaged into the initial engagement section 44a of the heart-cam groove 44 (see FIGS. 5 and 6).

Figure 17:
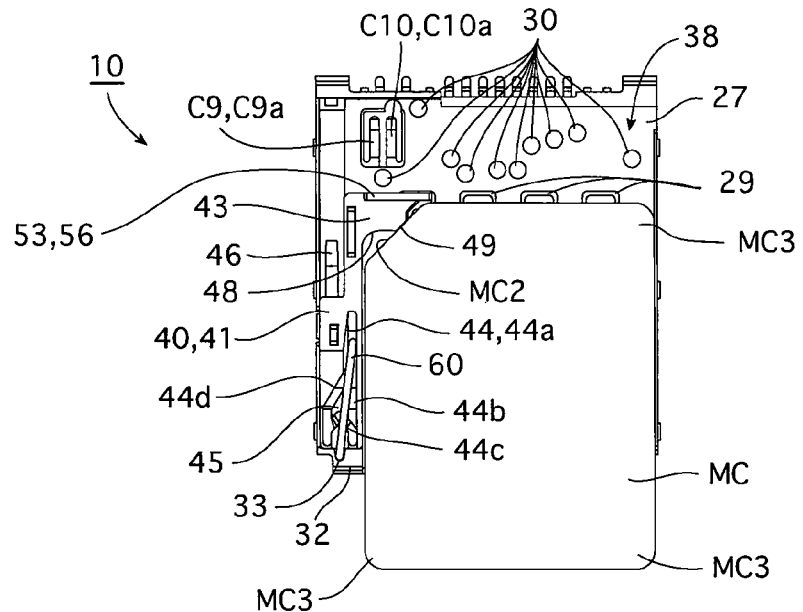
FIG. 17 is a plan view similar to that of FIG. 13 showing the cut-off portion of the micro SIM card abutting a correct-insertion abutting portion of the slider, which is positioned at the initial position.
Figure 18:
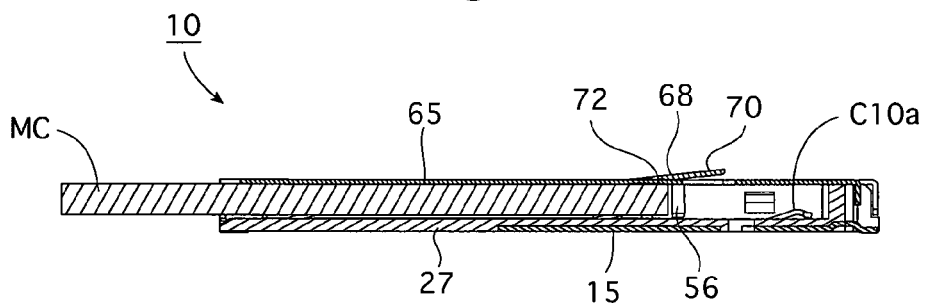
FIG. 18 is a sectional view similar to that of FIG. 15 in the state shown in FIG. 17.
Figure 19:
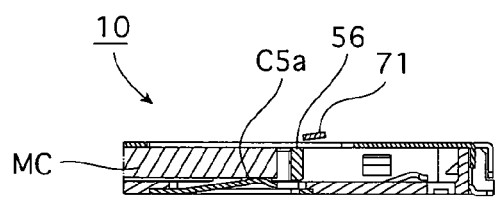
FIG. 19 is a sectional view similar to that of FIG. 16 in the state shown in FIG. 17.

In this state, a correctly oriented (in which the terminals MC1 are facing downward, and so that the left rear corner is the cutoff corner portion MC2) memory card MC is inserted into the accommodation portion 38 from the front opening of the memory card connector 10 (see FIGS. 13 through 16), and upon the memory card MC being pushed further rearward, the underside surface of the memory card MC comes in contact with the contact pieces C1a through C4a, and since the cutoff corner portion MC2 also abuts the correct-insertion abutting portion 49 of the slider body 41 (the abutment end 43), the memory card MC and the slider 40 become integrated with each other (see FIGS. 17 through 19). Furthermore, in this state, since the rear end portion (the portion positioned at the right side of the cutoff corner portion MC2) of the upper surface of the memory card MC contacts a region positioned forward from the stopper 71 of the pressure-receiving portion 72, and pushes this region of the pressure-receiving portion 72 upward, the stopper-switch leaf spring 68 that was positioned at the stopper-effective position elastically deforms and moves to the stopper-ineffective position (see FIG. 18). When the stopper-switch leaf spring 68 moves to the stopper-ineffective position, since the stopper 71, which had been engaged with the rear surface of the engaging portion 56, moves above the engaging portion 56 (see FIG. 19), the slider 40 becomes slidable from the initial position to the fully-inserted position.

Accordingly, since the slider 40 slides rearwardly against the biasing force of the compression coil spring S1 (while elastically deforming the compression coil spring S1 in the compression direction thereof) if the memory card MC is pushed further rearward from this state, the rear-end engaging projection 62 of the cam bar 60 that was engaged with the central portion of the initial engagement section 44a moves forward through the front portion of the initial engagement section 44a and the push-insertion passage section 44b with respect to the heart-cam groove 44 (engages the initial engagement section 44a and the push-insertion passage section 44b in that order). Thereafter, when the rear-end engaging projection 62 of the cam bar 60 has moved to the front end portion of the push-insertion passage section 44b (the section positioned in front of the heart-shaped protrusion 45), the slider 40 has reached the fully-inserted position (FIGS. 20 through 23).

After the slider 40 has reached the fully-inserted position, when the rearward pushing force against the memory card MC is released, since the holding section 44c of the slider body 41 that is pushed forward (pushed in the returning direction) by the biasing force of the compression coil spring S1 engages with the rear-end engaging projection 62 of the cam bar 60, the slider 40 is held at the fully-inserted position (the sliding of the slider 40 in the forward direction is restricted). Since when the slider 40 has reached the fully-inserted position, the contacts C1 through C8 (contact pieces C1a through C8a) come in contact with the corresponding terminals MC1 of the memory card MC, respectively, the memory card MC and the circuit board CB become electrically conductive with each other via the contacts C1 through C8.

Furthermore, since when the slider 40 is moved to the fully-inserted position, the base portion 55 of the conductor/engagement member 53 contacts the contact pieces C9a and C10a (the contact pieces C9a and C10a are elastically deformed downwards)(see FIG. 23), and the contact pieces C9a and C10a are electrically conductive with each other.

Accordingly, since the above-mentioned insertion-state detection circuit pattern formed on the circuit board CB sends a detection signal to a controller in the mobile phone, the controller detects that the memory card MC has been correctly inserted into the mobile phone (memory card connector 10).

In a state where the slider 40 is held at the fully-inserted position, when the rearward pressing force against the memory card MC is released after the memory card MC has again being pushed rearwardly against the biasing force of the compression coil spring S1, after the rear-end engaging projection 62 moves rearwardly away from the holding section 44c, the rear-end engaging projection 62 moves to (engages with) the return passage section 44d by the forward biasing force of the compression coil spring S1, the rear-end engaging projection 62 automatically moves through the return passage section 44d until an intermediate portion of the initial engagement section 44a. Accordingly, the slider 40 returns to the initial position (see FIGS. 17 through 19), and since the base portion 55 of the conductor/engagement member 53 moves away from the contact pieces C9a and C10a (since the contact pieces C9a and C10a enter a non-conductive state), the above-mentioned controller detects this state.

When the slider 40 returns to the initial position, since the stopper-switch leaf spring 68 that was positioned at the stopper-ineffective position moves (returns) to the stopper-effective position by the elastic returning force of the stopper-switch leaf spring 68 itself, the rear surface of the engaging portion 56 engages from the front direction with the front surface of the stopper 71 so that the sliding of the slider 40 toward the fully-inserted position is restricted (the slider 40 is held at the initial position). Accordingly, the memory card MC can be grasped by the hand and pulled, in the forward direction, out of the memory card connector 10.

Figure 24:
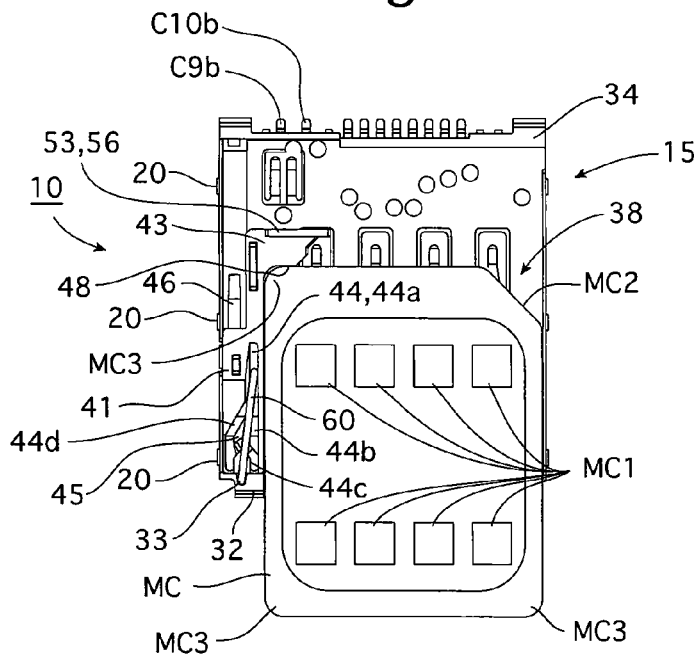
FIG. 24 is a plan view of the memory card connector and the micro SIM card, which has been inserted incorrectly into the connector, showing the cut-off portion of the micro SIM card abuts an incorrect-insertion abutting portion of the slider, positioned at the initial position, with the upper housing and a compression coil spring omitted.
Figure 25:
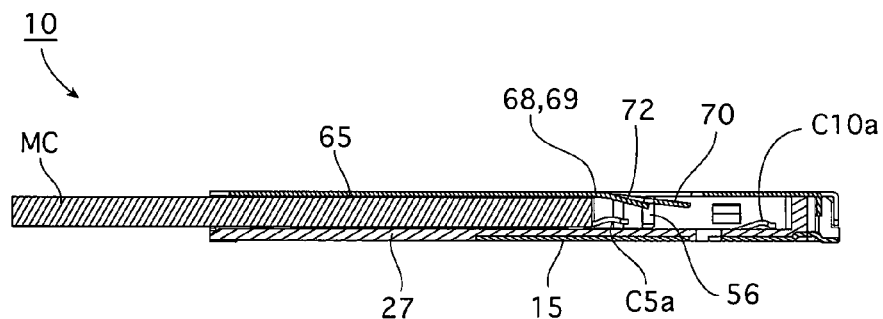
FIG. 25 is a sectional view similar to that of FIG. 15 in the state shown in FIG. 24.
Figure 26:
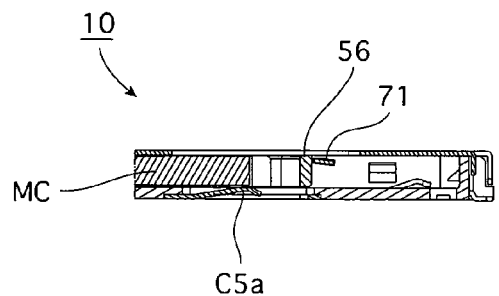
FIG. 26 is a sectional view similar to that of FIG. 16 in the state shown in FIG. 24.
Figure 27:
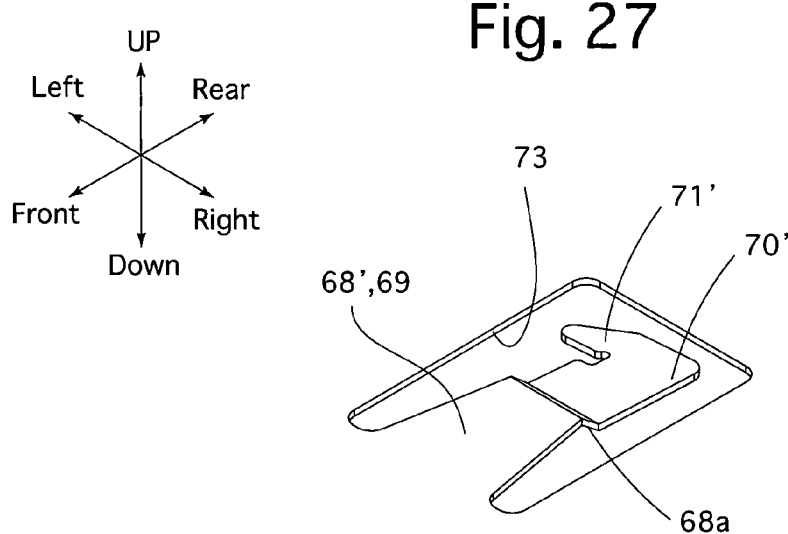
FIG. 27 is an enlarged view of the stopper-switch leaf spring and a surrounding portion thereof, as viewed from above, according to a modified embodiment.
Figure 28:
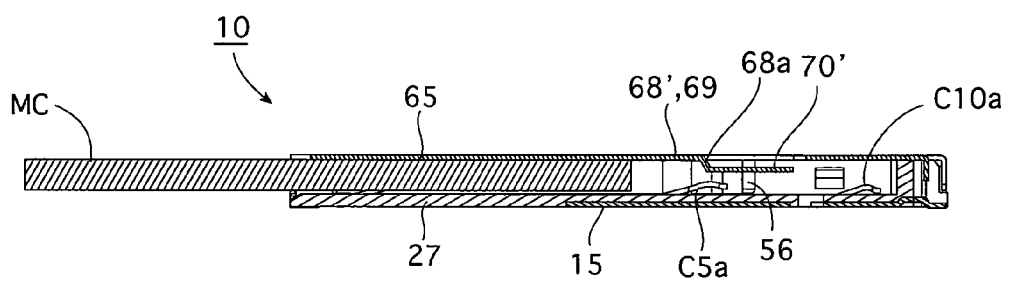
FIG. 28 is a sectional view similar to that of FIG. 15 of the modified embodiment.
Figure 29:
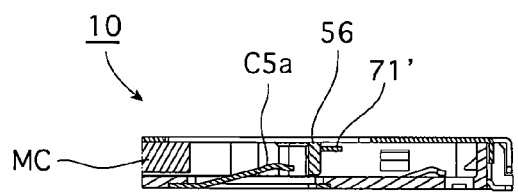
FIG. 29 is a sectional view similar to that of FIG. 16 of the modified embodiment.

Hereinbelow, the case in which the memory card MC is inserted into the accommodation portion 38 from the front opening of the memory card connector 10 in an incorrectly oriented manner (with the terminals MC1 facing upwards), as shown in FIGS. 24 through 26, will the described.

In this case, as shown in FIGS. 24 through 26, the front surface of the non-cutoff corner portion MC3 (the left rear corner portion) of the memory card MC abuts against the incorrect-insertion abutting portion 48 of the slider body 41 (abutment end 43) that is positioned at the initial position, so that the memory card MC and the slider 40 become integral with each other. At this state, since the rear end position of the memory card MC is positioned further forward than the position of the memory card MC when inserted correctly (see FIG. 17), the rear end portion of the upper surface of the memory card MC does not upwardly press the pressure-receiving portion 72 (is positioned forward from the pressure-receiving portion 72 so that the memory card MC does not interfere with the pressure-receiving portion 72; see FIG. 25). Accordingly, since the stopper-switch leaf spring 68 is positioned at the stopper-effective position and the stopper 71 continues to abut against the engaging portion 56 (see FIG. 26), the slider 40 is still restricted (prevented) from sliding from the initial position to the fully-inserted position, so that even if the memory card MC is pushed further rearward in this state, the memory card MC and the slider 40 do not slide to the fully-inserted position, and furthermore, the base portion 55 of the conductor/engagement member 53 does not contact either of the contact pieces C9a and C10a.

Note that also in the case where the memory card MC is incorrectly oriented differently from the incorrect orientation shown in FIGS. 24 through 26 (in which, e.g., the terminals MC1 face downwardly and the cutoff corner portion MC2 is oriented at the front end side of the memory card MC), if the memory card MC is inserted into the accommodation portion 38 of the memory card connector 10, since front surface of the non-cutoff corner portion MC3 (left rear corner portion) of the memory card MC abuts against the incorrect-insertion abutting portion 48 of the slider body 41 (abutment end 43), the slider 40 also cannot slide from the initial position to the fully-inserted position.

As described above, the memory card connector 10 in the illustrated embodiment utilizes the stopper-switch leaf spring 68 (the pressure-receiving portion 72 and the stopper 71), rather than inclining the memory card MC relative to the memory card connector 10 and engaging the memory card MC with a hole formed in a housing, to reliably prevent the terminals MC1 of an incorrectly-inserted (oriented incorrectly) memory card MC from contacting the contacts C1 through C8 (contact pieces C1a through C8a) by restricting the movement of the slider 40 from the initial position to the fully-inserted position. Accordingly, the memory card connector 10 can prevent memory cards, having various shapes, each having one corner portion thereof cut off (cutoff corner portion MC2) and having a substantially rectangular shape as a whole, from being incorrectly oriented while being inserted into the memory card connector 10.

Furthermore, when the stopper-switch leaf spring 68 is in a free state (when the memory card MC is not inserted into the memory card connector 10), since the entire stopper-switch leaf spring 68 is positioned inside the accommodation portion 38 (since the entire stopper-switch leaf spring 68 is provided within the upper housing 65 so as not to externally protrude away from the upper housing 65, in other words, the entire stopper-switch leaf spring 68 is positioned toward the accommodation portion 38 from the upper surface of the upper housing 65), the entire memory card connector 10 can be formed to have a low profile.

Furthermore, the memory card connector 10 has a configuration which utilizes the stopper-switch leaf spring 68 that is provided on the upper housing 65, the number of components are not increased, and the structure thereof remains simple.

Furthermore, since the conductor/engagement member 53 which abuts against the metal stopper 71 is also made of metal, even if the stopper 71 abuts the engaging portion 56, or the memory card MC is pushed in the insertion direction with a large force in a state where the stopper 71 and the engaging portion 56 are engaged with each other, neither the engaging portion 56 (conductor/engagement member 53) nor the stopper 71 (stopper-switch leaf spring 68) are easily damaged or broken. Therefore, even if the insertion and removal of the memory card MC is repeatedly carried out, the incorrect insertion of the memory card MC can be reliably prevented (and even if the engaging portion 56 (conductor/engagement member 53) and the stopper 71 (stopper-switch leaf spring 68) are miniaturized due to producing the memory card connector 10 with a low profile and miniaturizing the memory card connector 10, the same effect can be exhibited).

Furthermore, since the conductor/engagement member 53 not only has the function of abutting with the memory card MC that has been correctly inserted (oriented correctly), the conductor/engagement member 53 also has a conductive ability with the first detection terminal C9 (contact piece C9a) and the second detection terminal C10 (contact piece C10a), the memory card connector 10 can be simply produced and at a low cost compared to the case where the member to which the correctly-inserted memory card MC abuts and the member which is conductive with the first detection terminal C9 (contact piece C9a) and the second detection terminal C10 (contact piece C10a) are mutually separate members.

Since the stopper-switch leaf spring 68 is integrally formed with the upper housing 65, the stopper-switch leaf spring 68 can be produced simply and at a lower cost than in the case where the upper housing 65 and the stopper-switch leaf spring 68 are provided as separate members.

Furthermore, the stopper-switch leaf spring 68 has a shape such as to extend rearwardly from the base portion (front end portion) thereof, and the stopper 71 and the pressure-receiving portion 72 are formed on the rear end portion (in the vicinity of the rear end) of the stopper-switch leaf spring 68. Accordingly, it is possible to reduce the dimensions in the forward/rearward direction of the upper housing 65 (and the memory card connector 10) compared to the case in which the stopper-switch leaf spring 68 were to have a shape that extended forwardly from the base portion (rear end portion) thereof and the stopper 71 and the pressure-receiving portion 72 were to be formed at the front end portion (in the vicinity of the front end portion) of the stopper-switch leaf spring 68.

The present invention is not limited to the above-described embodiment; the present invention can be implemented with various modifications applied thereto.

For example, the present invention can be applied to a memory card connector into which a memory card other than a micro SIM card (e.g., a micro SD card, or a SIM card, etc.) can be inserted into and removed from. Furthermore, so long as the shape of the memory card has a substantially rectangular shape having one corner thereof formed as a cutoff corner portion and the remaining corners there of formed as non-cutoff corner portions, the shape of the memory card can differ from that shown in the drawings.

Furthermore, the memory card connector 10 can be installed in an apparatus other than a mobile phone (e.g., a PDA, a tablet computer, a personal computer, a digital camera, or a digital video camera, etc.).

Furthermore, the slider 40 can be configured by integrating the slider body 41 with the conductor/engagement member 53 (e.g., by insert molding), or the entire slider 40 can be formed from the same material (e.g., from resin or metal, etc.).

Furthermore, the upper housing 65 and the stopper-switch leaf spring 68 (or a stopper-switch leaf spring 68' described below) can be formed as separate members, and thereafter the base portion of the stopper-switch leaf spring 68 (stopper-switch leaf spring 68') can be fixed to the upper housing 65. Similarly, the stopper 71 (71') and/or the pressure-receiving portion 72 (pressure-receiving portion 68a) can be formed separately from the stopper-switch leaf spring 68 (stopper-switch leaf spring 68'), and thereafter the stopper 71 (71') and/or the pressure-receiving portion 72 (pressure-receiving portion 68a) can be fixed to the stopper-switch leaf spring 68 (stopper-switch leaf spring 68').

Furthermore, the pressure-receiving portion 72 can be configured so as to elastically deform (slightly) when pressed by the memory card.

Furthermore, part of the stopper-switch leaf spring can be utilized as a pressure-receiving portion without cutting out (punching out) part of the stopper-switch leaf spring.

FIGS. 27 through 31 show a modified embodiment that applied such a technical concept. A stopper-switch leaf spring 68' is provided with a front portion 69 which lies in a horizontal plane in a free state (and lies on the same plane as that of the roof surface of the upper housing 65), a pressure-receiving portion 68a which extends from the entire rear end of the front portion 69 in an inclined direction rearwardly downward, and a rear portion 70' which extends rearwardly from the rear end of the pressure-receiving portion 68a and lies in a horizontal plane in a free state. A stopper 71' is formed on the end (rear end) of the rear portion 70' and projects leftward therefrom (the pressure-receiving portion 68a is positioned forward from the front surface of the stopper 71'). When the stopper-switch leaf spring 68' is in a free state, the flat-surfaced front surface (restriction surface) of the stopper 71' is normal (orthogonal) to a straight line extending in the forward/rearward direction. Furthermore, when the slider 40 is positioned at the initial position and the stopper-switch leaf spring 68' is positioned at the stopper-effective position, the rear surface of the engaging portion 56 is in surface contact (engages) with the flat-surfaced front surface (restriction surface) of the stopper 71' from the front (see FIG. 29).

Figure 30:
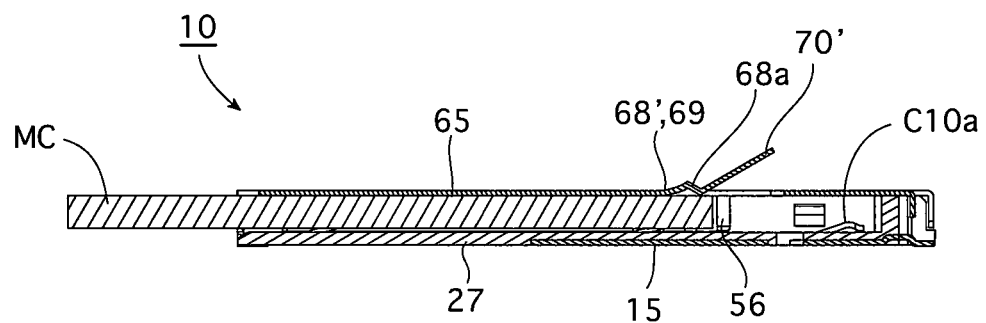
FIG. 30 is a sectional view similar to that of FIG. 18 of the modified embodiment.

When the memory card MC is correctly oriented while inserted into a memory card connector 10 provided with the stopper-switch leaf spring 68' (see FIG. 28) and the cutoff corner portion MC2 of the memory card MC abuts against the correct-insertion abutting portion 49 of the slider body 41 (abutment end 43), since the rear end portion of the upper surface of the memory card MC (the portion thereof positioned on the right side of the cutoff corner portion MC2) presses the pressure-receiving portion 68a upward, the stopper-switch leaf spring 68' that was positioned at the stopper-effective position elastically deforms and moves to the stopper-ineffective position (see FIG. 30). Thereafter, since the stopper 71' that was engaged with the rear surface of the engaging portion 56 moves above the engaging portion 56 (see FIG. 30; although the stopper 71' is not shown in FIG. 30, the stopper 71' moves up to the same height as that of the end of the rear portion 70'), the slider 40 can slidably move from the initial position to the fully-inserted position.

Figure 31:
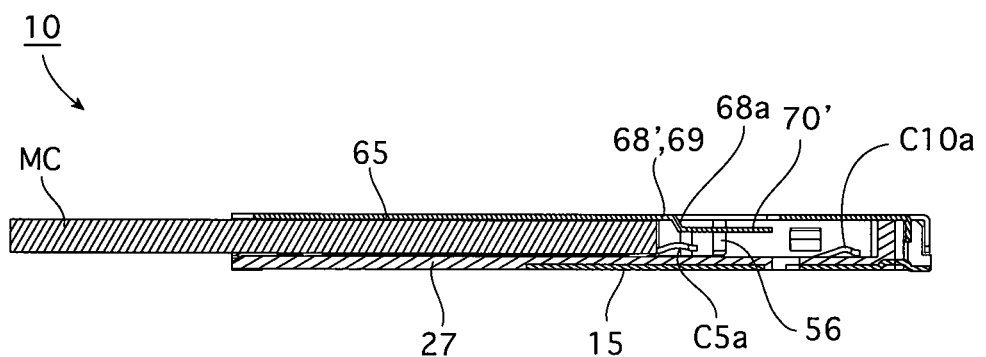
FIG. 31 is a sectional view similar to that of FIG. 25 of the modified embodiment.

On the other hand, if an incorrectly oriented memory card MC is inserted into the memory card connector 10, as shown in FIG. 31, the non-cutoff corner portion MC3 of the memory card MC abuts against the incorrect-insertion abutting portion 48 of the slider body 41 (abutment end 43) that is positioned at the initial position, so that the memory card MC and the slider 40 becomes integral with each other. At this state, since the rear end position of the memory card MC is positioned further forward than when the memory card MC is correctly oriented when inserted, the rear portion of the upper surface of the memory card MC does not press the pressure-receiving portion 68a upward (the rear portion of the memory card MC is positioned further forward from the pressure-receiving portion 68a; see FIG. 31). Accordingly, the stopper-switch leaf spring 68' is positioned at the stopper-effective position, and the stopper 71' continues to abut against the engaging portion 56. Hence, since the slider 40 is still prevented from slidably moving from the initial position to the fully-inserted position, even if the memory card MC is push rearwardly in this state, the memory card MC and the slider 40 cannot slidably move to the fully-inserted position.

The memory card connector 10 according to this modified embodiment also exhibits the same effects as those of the above-described embodiment.

In addition, in the memory card connector 10 of the modified embodiment, since the stopper-switch leaf spring 68' does not have a cutout portion, and moreover, since the pressure-receiving portion 68a is formed across the entire leftward/rightward width of the stopper-switch leaf spring 68', the stopper-switch leaf spring 68' still maintains its mechanical strength even if the memory card connector 10 is further miniaturized.

Furthermore, since the width in the leftward/rightward direction of the pressure-receiving portion 68a is larger than that of the pressure-receiving portion 72, when the memory card MC is inserted into the memory card connector 10 in a correctly oriented manner, the memory card MC can reliably abut against the pressure-receiving portion 68*a*.

Furthermore, since when the stopper-switch leaf spring 68' is positioned at the stopper-effective position (when in a free state), the rear surface of the engaging portion 56 engages with the front surface (restriction surface) of the stopper 71' while in surface contact with each other, the slider 40 (engaging portion 56) can be reliably restricted from slidably moving rearwards.

Note that the pressure-receiving portion 68*a* of the stopper-switch leaf spring 68' can be formed so as to extend downwardly from the rear end of the front portion 69.

Furthermore, the pressure-receiving portion 68*a* does not need to be formed across the entire width of the stopper-switch leaf spring 68'; the front end of the pressure-receiving portion 68*a* can be narrower than the rear end portion of the front portion 69.

The stopper 71 can be formed such that the flat-surface front surface (restriction surface) of the stopper 71 is normal (orthogonal) to a line extending in the forward/rearward direction when the stopper-switch leaf spring 68 is positioned at the stopper-effective position (in a free state).

A region can be formed on the stopper-switch leaf spring 68 or 68' corresponding to the pressure-receiving portion 72 or pressure-receiving portion 68*a* by indenting the upper surface of the stopper-switch leaf spring 68 or 68' downwards (and inclining downwardly).

Furthermore, the entire pressure-receiving portion 72 does not need to be positioned forward of the front surface of the stopper 71, the region (of the pressure-receiving portion 72) contacting the rear end portion of the upper surface of the memory card which is correctly inserted into the memory card connector can be positioned forward than the front surface of the stopper 71, and the rear end portion of the pressure-receiving portion 72 can be positioned rearwardly from the front surface of the stopper 71.

Furthermore, the forward/rearward positional relationship of the stopper 71 and the pressure-receiving portion 72 of the stopper-switch leaf spring 68 can be reversed.

Other obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A memory card connector comprising:
   a housing including an accommodation portion, into which a substantially rectangular memory card having one cutoff corner portion and the remaining corners thereof having non-cutoff corner portions is removably insertable, and a plurality of contacts provided in said accommodation portion which are electrically conductive with terminals that are provided on said memory card;
   a slider which is slidably movable with said memory card between an initial position, at which said memory card is positioned on an outer side of said accommodation portion, and a fully-inserted position, at which said memory card is fully-inserted inside said accommodation portion together with said slider;
   a correct-insertion abutting portion and an incorrect-insertion abutting portion provided on said slider, wherein said cutoff corner portion of said memory card abuts against said correct-insertion abutting portion when said memory card is correctly oriented while inserted into said accommodation portion, and wherein one of said non-cutoff corner portions of said memory card abuts against said incorrect-insertion abutting portion when said memory card is incorrectly oriented while inserted into said accommodation portion;
   a stopper-switch leaf spring provided on said housing, wherein when said cutoff corner portion of said memory card abuts said correct-insertion abutting portion of said slider, which is positioned at said initial position, said stopper-switch leaf spring is positioned at a stopper-ineffective position via a pressure-receiving portion of said stopper-switch leaf spring being pressed by said memory card, and wherein when said non-cutoff corner portion of said memory card abuts said incorrect-insertion abutting portion of said slider, which is positioned at said initial position, said stopper-switch leaf spring is positioned at a stopper-effective position in which said memory card does not interfere with said pressure-receiving portion; and
   a stopper which is provided on said stopper-switch leaf spring, wherein said slider is allowed to slidably move from said initial position to said fully-inserted position when said stopper-switch leaf spring is positioned at said stopper-ineffective position, and said slider is prevented from slidably moving from said initial position to said fully-inserted position when said stopper-switch leaf spring is positioned at said stopper-effective position,
   wherein said stopper-switch leaf spring and said stopper are provided within said housing so as not to externally protrude away from said housing when said stopper-switch leaf spring is in a free state.

2. The memory card connector according to claim 1, wherein a part of said pressure-receiving portion that is pressed by said memory card is positioned toward a removal direction of said memory card with respect to said stopper.

3. The memory card connector according to claim 2, wherein said stopper-switch leaf spring comprises a cantilever spring, and
   wherein said pressure-receiving portion which extends in a direction toward said memory card, when said memory card is fully-inserted into said accommodation portion, is formed at an intermediate position on said stopper-switch leaf spring with respect to the longitudinal direction thereof.

4. The memory card connector according to claim 1, wherein a restriction surface formed on said stopper lies on a plane that is normal to a straight line extending in the insertion/removal direction of said memory card when said stopper-switch leaf spring is in said free state, and
   wherein said slider is prevented from slidably moving from said initial position to said fully-inserted position when said stopper-switch leaf spring is positioned at said stopper-effective position.

5. The memory card connector according to claim 1, wherein said slider is provided with a metal engaging portion which abuts said stopper when said stopper-switch leaf spring is positioned at said stopper-effective position.

6. The memory card connector according to claim 5, wherein said housing comprises a first detection terminal and a second detection terminal which are separated from each other and each are connected to an insertion-state detection circuit, and
   wherein said metal engaging portion comes in contact with said first detection terminal and said second detection terminal and becomes electrically conductive therewith when said slider has been slidably moved to said fully-inserted position.

7. The memory card connector according to claim 1, wherein said housing comprises:
- a lower housing, including an open upper side; and
- a metal upper housing, wherein the lower side thereof is open, said metal upper housing being fixed onto said lower housing while covering said open upper side of said lower housing,
- wherein a metal said stopper-switch leaf spring and said stopper are integrally formed on part of said upper housing.

8. The memory card connector according to claim 1, wherein said stopper-switch leaf spring comprises a cantilever stopper-switch leaf spring which extends in the insertion direction of said memory card from a base portion of said stopper-switch leaf spring, and
- wherein said pressure-receiving portion and said stopper are formed at an end, or in the vicinity of the end, of said stopper-switch leaf spring.

\* \* \* \* \*

UNITED STATES PATENT AND TRADEMARK OFFICE
CERTIFICATE OF CORRECTION

PATENT NO. : 8,864,525 B2  
APPLICATION NO. : 13/826299  
DATED : October 21, 2014  
INVENTOR(S) : Hidehiro Nakamura Page 1 of 1

It is certified that error appears in the above-identified patent and that said Letters Patent is hereby corrected as shown below:

ON THE TITLE PAGE

Item 30, foreign application priority data "March 11, 2012" should be changed to --March 22, 2012--.

Signed and Sealed this  
Tenth Day of May, 2016

Michelle K. Lee  
*Director of the United States Patent and Trademark Office*